US012621856B2

(12) United States Patent
Zhou et al.

(10) Patent No.: US 12,621,856 B2
(45) Date of Patent: May 5, 2026

(54) ACTIVE TIME EXTENSION FOR BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Peter Gaal, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/655,201

(22) Filed: Mar. 17, 2022

(65) Prior Publication Data

US 2023/0300870 A1     Sep. 21, 2023

(51) Int. Cl.
*H04W 72/542*     (2023.01)
*H04W 24/10*     (2009.01)
*H04W 76/28*     (2018.01)

(52) U.S. Cl.
CPC ......... *H04W 72/542* (2023.01); *H04W 24/10* (2013.01); *H04W 76/28* (2018.02)

(58) Field of Classification Search
None
See application file for complete search history.

(56) References Cited

U.S. PATENT DOCUMENTS 12,256,252 B2 * 3/2025 Alfarhan .............. H04B 17/318
2020/0389874 A1 * 12/2020 Lin ....................... H04L 5/0053

2021/0297139 A1 * 9/2021 Kwon ............... H04W 52/0229
2021/0392717 A1   12/2021 Ryu et al.
2024/0056850 A1 * 2/2024 Agiwal ............ H04W 52/0216

FOREIGN PATENT DOCUMENTS

CN        110392380 A  * 10/2019 ............ H04W 76/28
WO    WO-2021093670 A1 *  5/2021 ............ H04W 24/08

OTHER PUBLICATIONS

Nokia, Nokia Shanghai Bell, Measurements for BFD/BFR and RLM outside active time, 3GPP TSG RAN WG1 meeting #99 R1-1913118 (Year: 2019).*
Nokia, Corrections of cross-slot scheduling restriction and CSI/L1-RSRP measurement outside active time, 3GPP TSG-RAN WG1 Meeting #100 R1-2001447 (Year: 2020).*
3GPP TSG-RAN WG1 Meeting #100 R1-2001447 (Year: 2020).*
Daniela L., et al., "UE Measurements Relaxation for UE Power Saving in 5G New Radio", 2021 IEEE 94th Vehicular Technology Conference (VTC2021-FALL), IEEE, Sep. 27, 2021, pp. 1-6, XP034041946, p. 2-p. 4.

(Continued)

*Primary Examiner* — Luna Weissberger

(74) *Attorney, Agent, or Firm* — Harrity & Harrity, LLP

(57)        ABSTRACT

Various aspects of the present disclosure generally relate to wireless communication. In some aspects, a user equipment (UE) may receive one or more beam failure detection (BFD) reference signals (RSs) during an active time under discontinuous reception (DRX). The UE may monitor BFD-RSs in an active time extension that is outside the active time for DRX. The UE may receive one or more BFD-RSs during the active time extension. Numerous other aspects are described.

30 Claims, 12 Drawing Sheets

700 ⟶

(56) References Cited

OTHER PUBLICATIONS

International Search Report and Written Opinion—PCT/US2023/
063220—ISA/EPO—May 17, 2023.
Nokia et al., "Regarding Measurements Outside Active Time",
3GPP TSG-RAN WG4 Meeting#94-e, R4-2001335, 3rd Generation
Partnership Project (3GPP), Mobile Competence Centre, 650, Route
Des Lucioles, F-06921 Sophia-Antipolis Cedex, France, vol. RAN
WG4, No. E-meeting, Feb. 24, 2020-Mar. 6, 2020, 4 Pages, Feb. 14,
2020, XP051851260, p. 3-p. 4.

* cited by examiner

910  Receive one or more beam failure detection (BFD) reference signals (RSs) during an active time under discontinuous reception (DRX)

920  Monitor BFD-RSs in an active time extension that is outside the active time for DRX 930  Receive one or more BFD-RSs during the active time extension

900

1010  Transmit one or more BFD-RSs during an active time under DRX

1020  Transmit one or more BFD-RSs during an active time extension that is outside the active time for DRX 1030  Receive a BFD report that is associated with the one or more BFD-RSs transmitted during the active time extension 1040  Perform an action based at least in part on the BFD report

1000

ACTIVE TIME EXTENSION FOR BEAM FAILURE DETECTION

FIELD OF THE DISCLOSURE

Aspects of the present disclosure generally relate to wireless communication and to techniques and apparatuses for extending an active time for beam failure detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more beam failure detection (BFD) reference signals (RSs) during an active time under discontinuous reception (DRX). The method may include monitoring BFD-RSs in an active time extension that is outside the active time for DRX. The method may include receiving one or more BFD-RSs during the active time extension.

Some aspects described herein relate to a method of wireless communication performed by a network entity. The method may include transmitting one or more BFD-RSs during an active time under DRX. The method may include transmitting one or more BFD-RSs during an active time extension that is outside the active time for DRX. The method may include receiving a BFD report that is associated with the one or more BFD-RSs transmitted during the active time extension. The method may include performing an action based at least in part on the BFD report.

Some aspects described herein relate to a UE for wireless communication. The UE may include a memory and one or more processors coupled to the memory. The one or more processors may be configured to receive one or more BFD-RSs during an active time under DRX. The one or more processors may be configured to monitor BFD-RSs in an active time extension that is outside the active time for DRX. The one or more processors may be configured to receive one or more BFD-RSs during the active time extension.

Some aspects described herein relate to a network entity for wireless communication. The network entity may include a memory and one or more processors coupled to the memory. The one or more processors may be configured to transmit one or more BFD-RSs during an active time under DRX. The one or more processors may be configured to transmit one or more BFD-RSs during an active time extension that is outside the active time for DRX. The one or more processors may be configured to receive a BFD report that is associated with the one or more BFD-RSs transmitted during the active time extension. The one or more processors may be configured to perform an action based at least in part on the BFD report.

Some aspects described herein relate to a non-transitory computer-readable medium that stores a set of instructions for wireless communication by a UE. The set of instructions, when executed by one or more processors of the UE, may cause the UE to receive one or more BFD-RSs during an active time under DRX. The set of instructions, when executed by one or more processors of the UE, may cause the UE to monitor BFD-RSs in an active time extension that is outside the active time for DRX. The set of instructions, when executed by one or more processors of the UE, may cause the UE to receive one or more BFD-RSs during the active time extension.

Some aspects described herein relate to a non-transitory computer-readable medium that stores a set of instructions for wireless communication by a network entity. The set of instructions, when executed by one or more processors of the network entity, may cause the network entity to transmit one or more BFD-RSs during an active time under DRX. The set of instructions, when executed by one or more processors of the network entity, may cause the network entity to transmit one or more BFD-RSs during an active time extension that is outside the active time for DRX. The set of instructions, when executed by one or more processors of the network entity, may cause the network entity to receive a BFD report that is associated with the one or more BFD-RSs transmitted during the active time extension. The set of instructions, when executed by one or more processors of the network entity, may cause the network entity to perform an action based at least in part on the BFD report.

Some aspects described herein relate to an apparatus for wireless communication. The apparatus may include means for receiving one or more BFD-RSs during an active time under DRX. The apparatus may include means for monitoring BFD-RSs in an active time extension that is outside the active time for DRX. The apparatus may include means for receiving one or more BFD-RSs during the active time extension.

Some aspects described herein relate to an apparatus for wireless communication. The apparatus may include means for transmitting one or more BFD-RSs during an active time under DRX. The apparatus may include means for transmitting one or more BFD-RSs during an active time extension that is outside the active time for DRX. The apparatus may include means for receiving a BFD report that is associated with the one or more BFD-RSs transmitted during the active time extension. The apparatus may include means for performing an action based at least in part on the BFD report.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
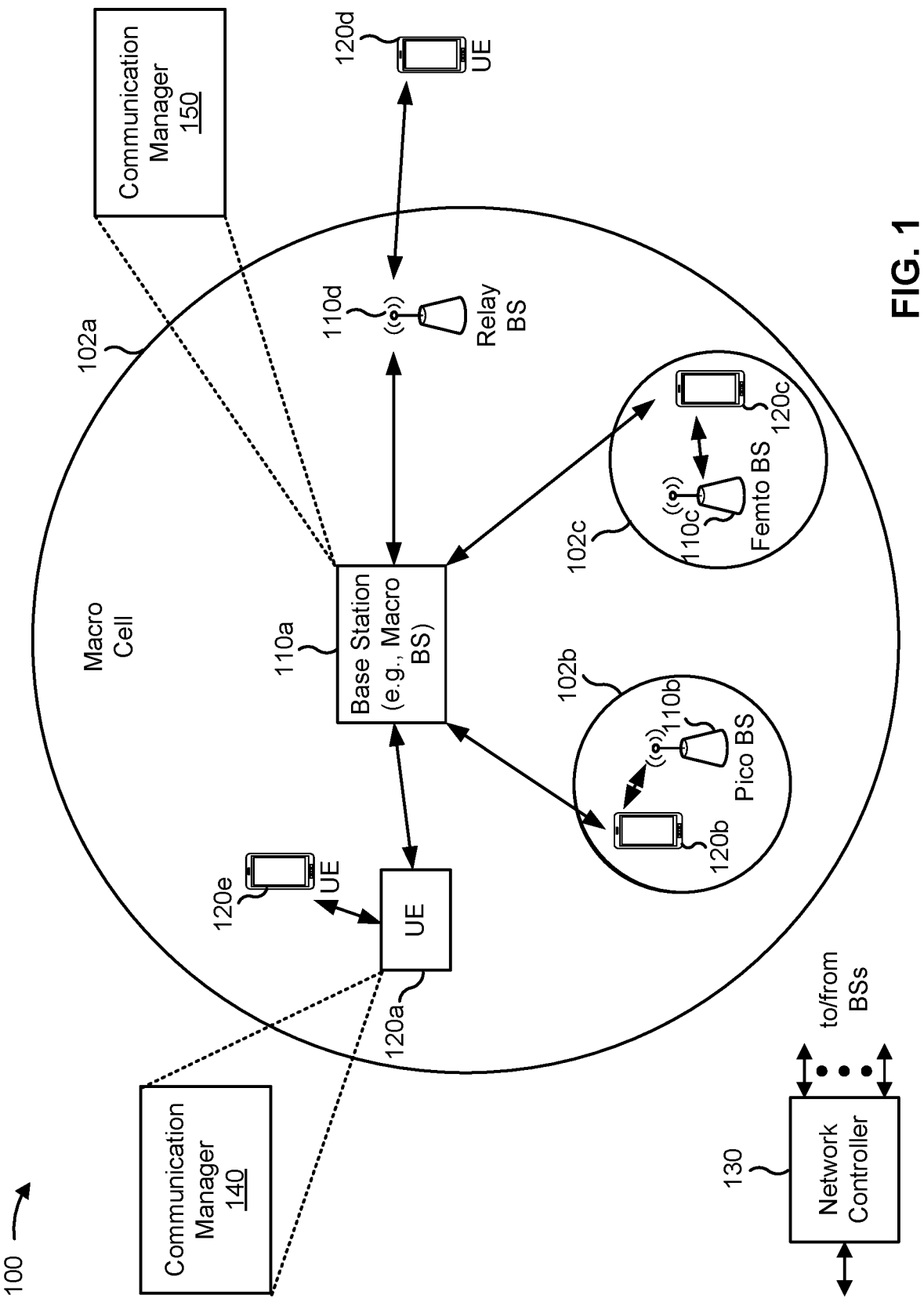
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more beam failure detection (BFD) reference signals (RSs) during an active time under discontinuous reception (DRX). The communication manager 140 may monitor BFD-RSs in an active time extension that is outside the active time for DRX and receive one or more BFD-RSs during the active time extension. Additionally, or alternatively, the communication manager 140 may perform one or more other operations described herein.

In some aspects, a network entity (e.g., the base station 110) may include a communication manager 150. As described in more detail elsewhere herein, the communication manager 150 may transmit one or more BFD reference signals (RSs) during an active time under DRX. The communication manager 150 may transmit one or more BFD-RSs during an active time extension that is outside the active time for DRX, receive a BFD report that is associated with the one or more BFD-RSs transmitted during the active time extension, and perform an action based at least in part on the BFD report. Additionally, or alternatively, the communication manager 150 may perform one or more other operations described herein.

As indicated above, FIG. 1 is provided as an example. Other examples may differ from what is described with regard to FIG. 1.

Figure 2:
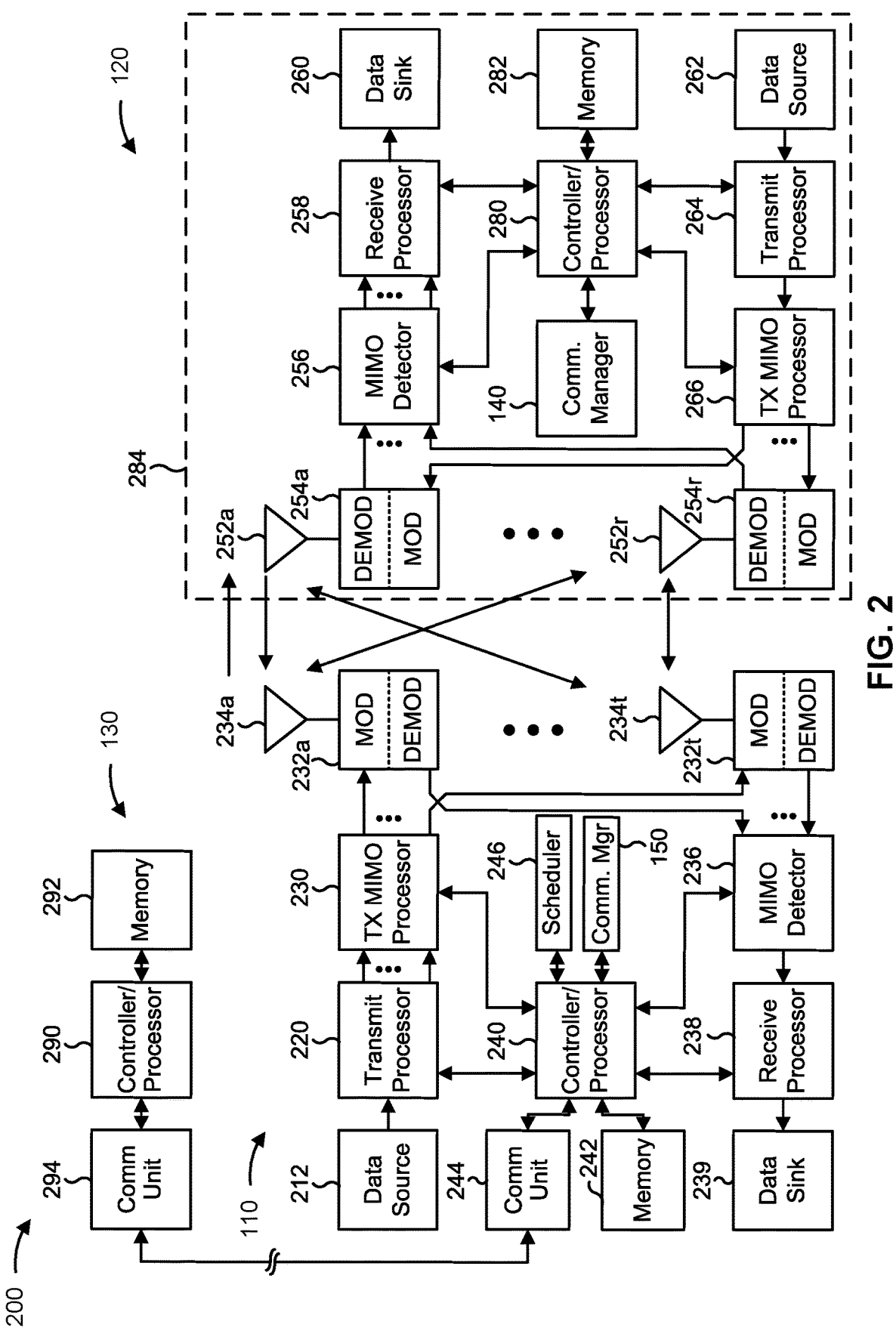
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

A controller/processor of a network entity, (e.g., the controller/processor 240 of the base station 110), the controller/processor 280 of the UE 120, and/or any other component(s) of FIG. 2 may perform one or more techniques associated with an active time extension for DRX, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving one or more BFD-RSs during an active time under DRX; means for monitoring BFD-RSs in an active time extension that is outside the active time for DRX; and/or means for receiving one or more BFD-RSs during the active time extension. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting one or more BFD-RSs during an active time under DRX; means for transmitting one or more BFD-RSs during an active time extension that is outside the active time for DRX; means for receiving a BFD report that is associated with the one or more BFD-RSs transmitted during the active time extension; and/or means for performing an action based at least in part on the BFD report. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
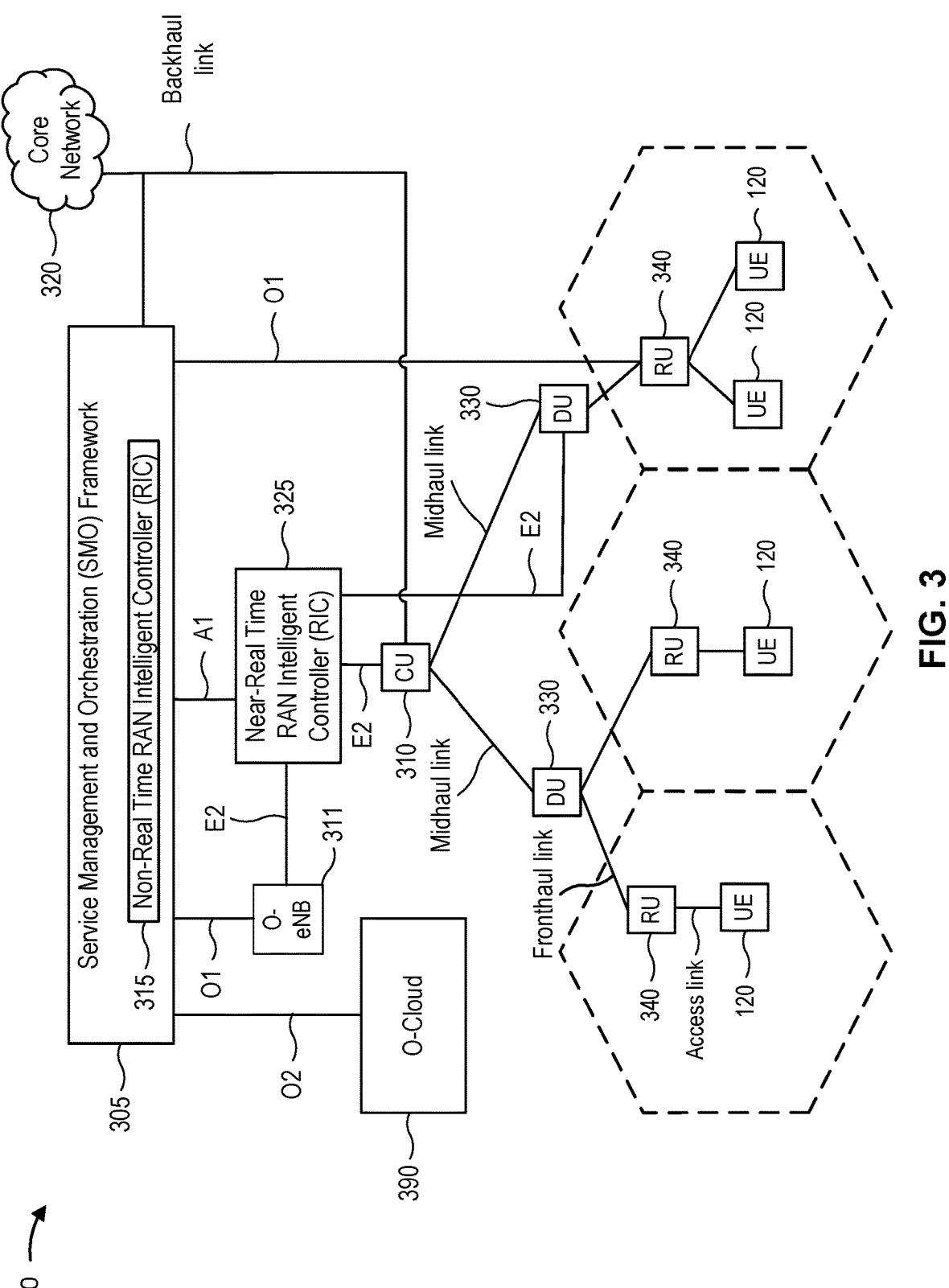
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
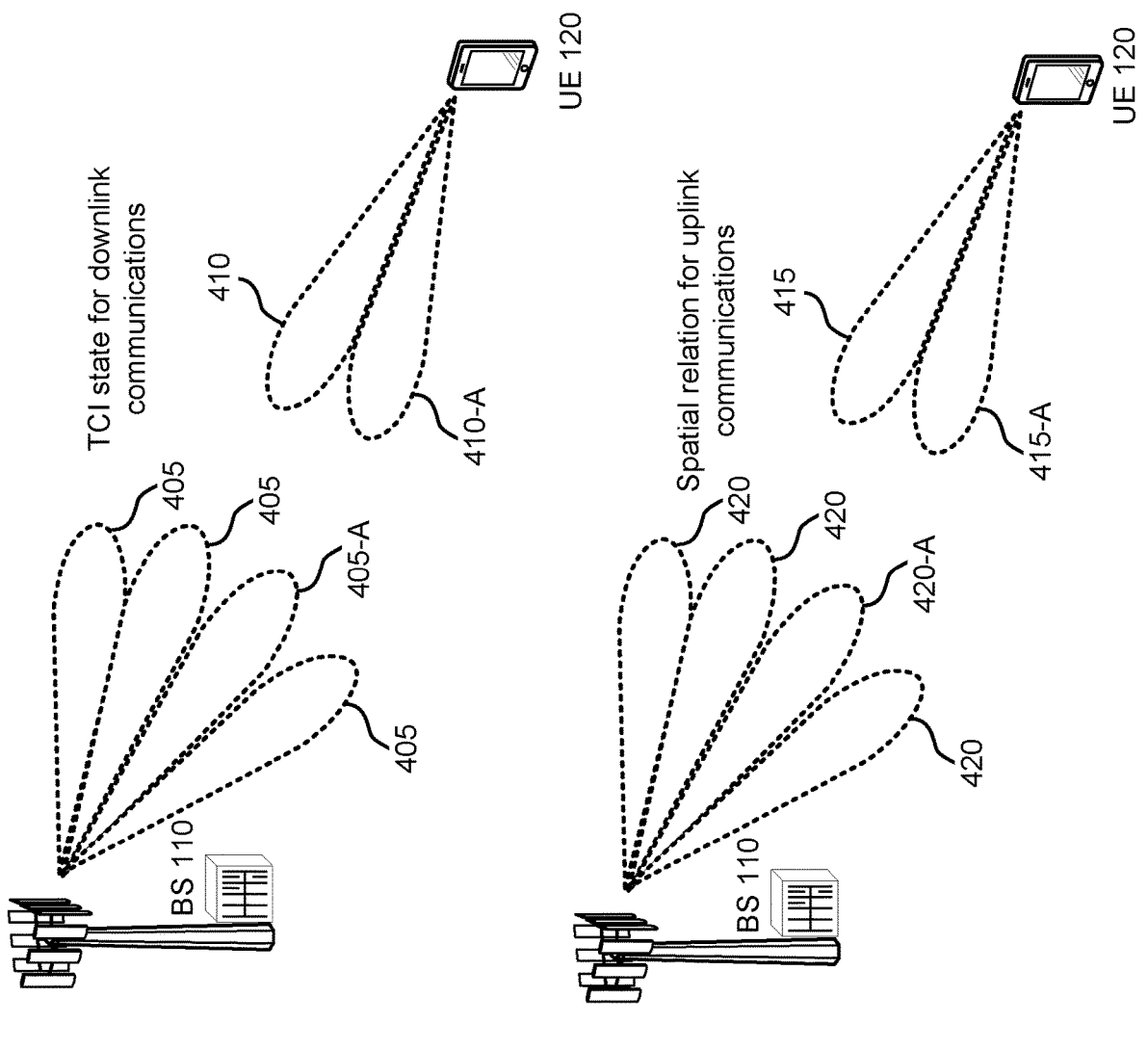
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a transmission configuration indicator (TCI) state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

3GPP standards Release 17 established a unified TCI state framework in which a TCI state may be used to indicate more than one beam. The TCI state may be used to indicate beams for a downlink channel or reference signal (such as PDCCH/PDSCH/CSI-RS) and/or an uplink channel or reference signal (such as physical uplink control channel (PUCCH)/physical uplink shared channel (PUSCH)/sounding reference signal (SRS)). There may be multiple types of unified TCI states. For example, a joint downlink/uplink common TCI state (joint TCI) may indicate a common beam for at least one downlink channel or reference signal and at least one uplink channel or reference signal. A separate downlink common TCI state (downlink TCI) may indicate a common beam for more than one downlink channel or reference signal. A separate uplink common TCI state (uplink TCI) may indicate a common beam for more than one uplink channel or reference signal. Other types of unified TCI states may include a separate downlink single channel or reference signal TCI state that indicates a beam for a single downlink channel or reference signal, a separate uplink single channel or RS TCI state that indicates a beam for a single uplink channel or reference signal, or an uplink spatial relation information, such as a spatial relation indicator (SRI), that indicates a beam for a single uplink channel or reference signal.

As indicated above, FIG. 4 is provided as an example. Other examples may differ from what is described with regard to FIG. 4.

Figure 5:
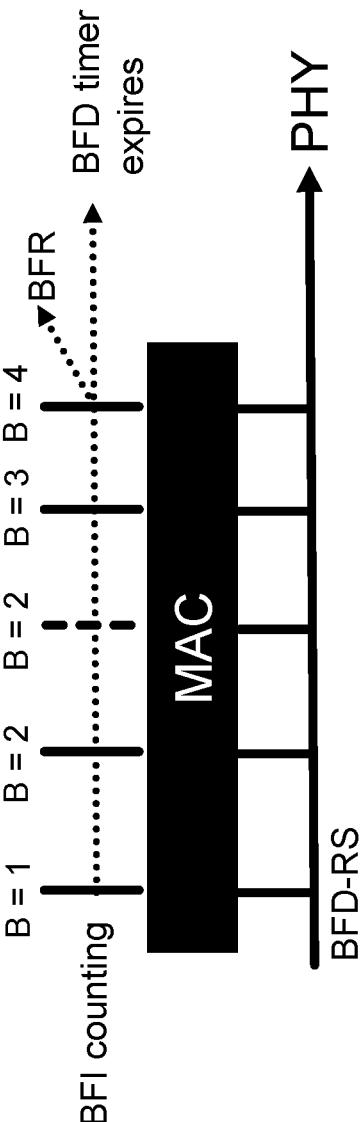
FIG. 5 is a diagram illustrating an example of beam failure detection, in accordance with the present disclosure.

FIG. 5 is a diagram illustrating an example 500 of BFD, in accordance with the present disclosure.

The UE 120 may use a BFD procedure to determine if a beam has failed. The BFD procedure may involve monitoring and measuring BFD-RSs (e.g., CSI-RSs and/or SSBs) that use a particular beam at a physical (PHY) layer. If measurements satisfy a failure threshold (e.g., minimum RSRP, minimum RSRQ, minimum signal to interference ratio (SIR), maximum block error rate (BLER)), the UE 120 may determine that failure of the beam has been detected. A measurement indicating beam failure at a BFD-RS occasion may be a beam failure instance (BFI).

Example 500 shows the counting of each BFI by a medium access control (MAC) entity (e.g., a UE 120) during a BFD timer. The UE 120 may determine whether there is a BFI at every occasion of a BFD-RS. At the first indication of a BFI, the UE 120 may start a BFD timer. With each BFI, the UE 120 may increase the BFI count by 1. If the total BFI count reaches or satisfies a BFI threshold (e.g., a maximum count (maxCount) threshold) before the BFD timer expires, the UE 120 may declare beam failure and initiate a beam failure recovery (BFR) procedure. The UE 120 may also transmit a BFD report. Otherwise, if the BFD timer expires before the BFI count reaches the maximum count threshold, the UE 120 may not declare beam failure. The UE 120 may reset the BFI count to 0 and reset the BFD timer.

If there is a beam failure, the UE 120 may perform a BFR procedure. The BFR procedure may involve a random access channel (RACH) procedure to reestablish a connection or transmitting a BFR request to the base station 110. The BFR request may include an indication of a new beam (e.g., a preferred candidate beam, an available candidate beam) that may be used for a beam reset for a primary cell (PCell) or a primary secondary cell (PSCell). In 3GPP standards Release 15, the base station 110 may transmit a response to the recovery request, such as a PDCCH communication with a new cellular random network temporary identifier (C-RNTI) in a CORESET and search space set configured for beam failure recovery. The UE 120 may reset the beam (e.g., to the candidate beam) after 28 symbols from a last symbol of a first PDCCH reception in a search space set (provided by recoverySearchSpaceId) for which the UE detects downlink control information (DCI) with a cyclic redundancy check (CRC) scrambled by a C-RNTI or an MCS C-RNTI (MCS-C-RNTI). The UE 120 may rest all PUCCH beams and power control parameters after receiving a BFR response. The UE 120 may use the candidate beam until the UE 120 receives an activation command for PUCCH-SpatialRelationInfo or is provided PUCCH-SpatialRelationInfo for PUCCH resources. The UE 120 may transmit a PUCCH communication on a same cell as a PRACH transmission using a same spatial filter that was used for the last PRACH transmission. The UE 120 may use a specified transmit power.

In a BFR scenario for 3GPP standards Release 16, the PDCCH communication, as the response to the recovery request, may be in a DCI format that schedules a PUSCH transmission with the same hybrid automatic repeat request (HARM) process ID as for the transmission of the first PUSCH carrying beam failure information and having a toggled new data indicator (NDI) field value. After 28 symbols from receiving a last symbol of the PDCCH communication, the UE 120 may monitor for PDCCH communications in all CORESETs on a secondary cell (SCell) indicated by a MAC control element (MAC CE) using the same antenna port QCL parameters as the QCL parameters associated with the corresponding index for a new beam (qnew). After receiving the BFR response, the UE 120 may reset all of the PUCCH beams and power control parameters for the SCell. The UE 120 may transmit a PUCCH communication on a PUCCH-SCell using the same spatial filter as a spatial filter for a new beam for periodic CSI-RS or SSB block reception, if the UE 120 is provided PUCCH-Spatial- RelationInfo for the PUCCH, a location report request (LRR) was not transmitted or was transmitted on the PCell or the PSCell, and the PUCCH-SCell is included in the SCells indicated by the MAC CE.

Current BFD procedures expect the UE to constantly monitor periodic BFD-RSs to detect beam failure. However, the UE may not have enough time to monitor BFD-RSs and to determine a radio beam quality. One such scenario is when the UE is in a DRX mode. A UE in a DRX mode may use periodic activity cycles for transmission and reception. The UE may transition between a sleep state for power conservation during an OFF period and an active state for data transmission and reception during an ON period. The active state (ON period) for data transmission and reception may be referred to as a DRX "ON-duration" or "on-duration." If the UE detects a potential issue with the beam but cannot declare beam failure during the limited DRX on-duration time, the UE may not report a beam failure and communications may degrade if the beam does fail during communication.

As indicated above, FIG. 5 is provided as an example. Other examples may differ from what is described with regard to FIG. 5.

Figure 6:
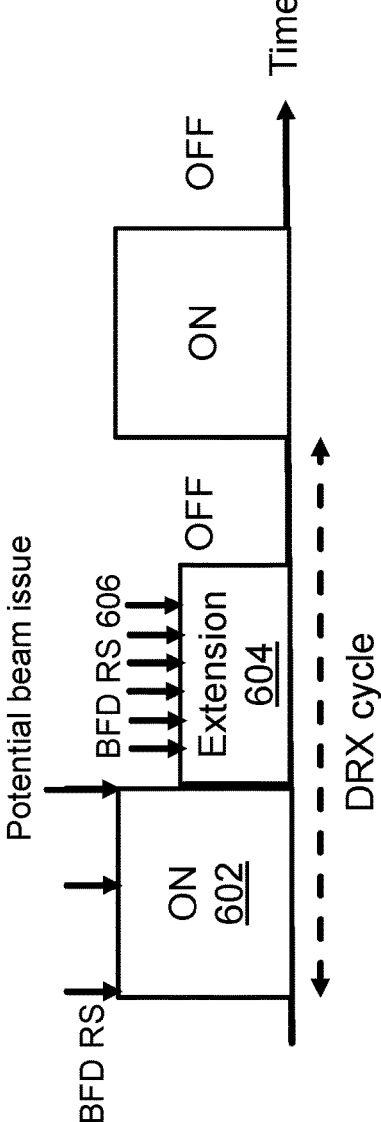
FIG. 6 is a diagram illustrating an example of an active time extension, in accordance with the present disclosure.

FIG. 6 is a diagram illustrating an example 600 of an active time extension, in accordance with the present disclosure.

UE DRX operation may be overridden by UE implementation and thus a UE may remain active during a DRX OFF period. For example, the UE may perform autonomous activities during a DRX OFF period. A network entity serving the UE may not be aware of the autonomous activities. Due to the UE activities during the DRX OFF period, the UE may obtain additional information regarding its channel condition, beam quality, or other conditions.

According to various aspects described herein, the UE may extend its current DRX active time in order to confirm a beam quality. The UE may extend the DRX active time from an on-duration 602 (shown in FIG. 6) into an active time extension 604 that is outside the original DRX active time (outside on-duration 602). The UE may request and receive BFD-RSs 606 during the active time extension. The BFD-RSs 606 may be aperiodic BFD-RSs. Aperiodic BFD-RSs may be BFD-RSs that are not part of preconfigured periodic BFD-RSs that occur during on-duration 602. The network entity may transmit the BFD-RSs 606 during active time extension 604 according to a configured periodicity or a location that is valid for BFD.

The UE may measure the BFD-RSs received during active time extension 604. This will help the UE to confirm a beam quality with a high probability before the next DRX cycle. The UE may notify the network entity quickly if there is a beam failure, even before the next DRX on-duration. The UE may use another beam in the next DRX, if necessary, and not waste signaling resources with a beam that may fail. This may be especially beneficial when there is a high quality-of-service (QoS) requirement, such as for extended reality pose updates or time-sensitive traffic that requires fast communication. The network entity may proactively switch beams and transmit a beam switch indication to the UE.

By enabling autonomous BFD during active time extension 604 in the DRX OFF period, the UE may determine and maintain beam quality more accurately and more quickly. The UE may avoid a potential beam failure, which results in lost or degraded communications that affect UE performance. The UE may also avoid the latency introduced by a RACH procedure.

As indicated above, FIG. 6 is provided as an example. Other examples may differ from what is described with respect to FIG. 6.

Figure 7:
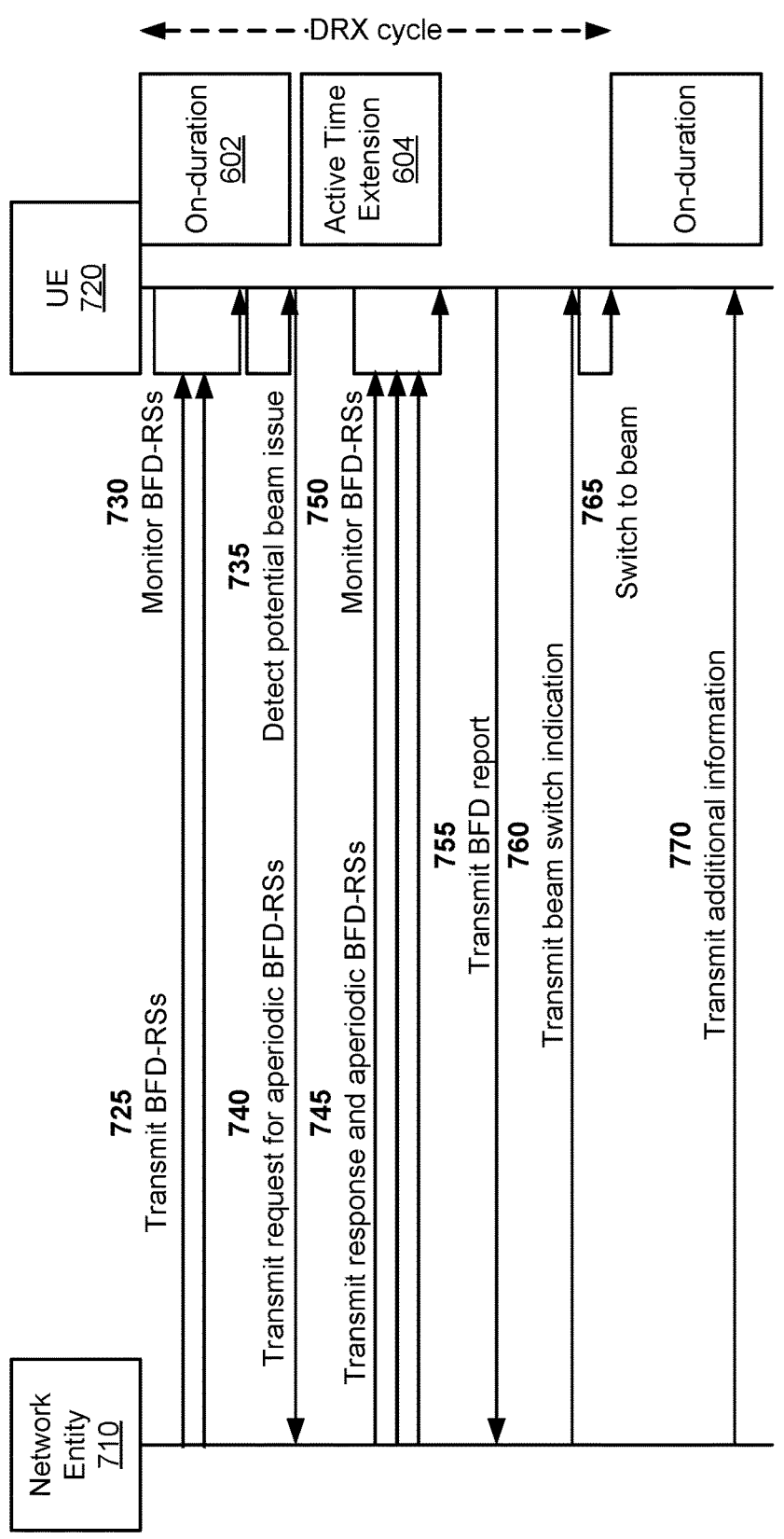
FIG. 7 is a diagram illustrating an example associated with extending an active time, in accordance with the present disclosure.

FIG. 7 is a diagram illustrating an example 700 associated with extending an active time, in accordance with the present disclosure. As shown in FIG. 7, a network entity 710 (e.g., a base station 110) and a UE 720 (e.g., a UE 120) may communicate with one another.

The UE 720 may signal use of an active time extension 604 by requesting an aperiodic BFD-RS. As shown by reference number 725, the network entity 710 may transmit BFD-RSs during an on-duration 602 of a DRX cycle. As shown by reference number 730, the UE 720 may monitor BFD-RSs. This may include measuring BFD-RSs and incrementing a BFI counter during a BFD timer. As shown by reference number 735, the UE 720 may detect a potential beam issue by an end of on-duration 602. For example, there may be a specified quantity of consecutive BFIs, a sudden drop in radio quality measurement values, or predicted blocking. In some aspects, the BFI counter may be close to reaching a maximum count threshold but on-duration 602 may end before a beam failure is detected. The UE 720 may determine that more BFD-RSs may be needed to determine if a beam is failing.

As shown by reference number 740, the UE 720 may transmit a request for aperiodic BFD-RSs. The UE 720 may transmit the request via a MAC CE or uplink control information (UCI). The request may include a DRX active time extension flag, which may include a value (e.g., length, starting time, ending time) for active time extension 604. The request may indicate preferred parameter values for the aperiodic BFD-RSs. The preferred parameter values may include a quantity of aperiodic BFD-RSs in a burst of BFD-RSs, a periodicity within the burst of BFD-RSs, a starting location (e.g., time, frequency) of the BFD-RSs, and/or a validity duration for the burst of BFD-RSs. The UE 720 may determine the preferred parameter values based at least in part on a configuration from the network entity 710 or stored configuration information. The UE 720 may transmit the request or an indication of the potential beam issue (e.g., with preferred beam information) at the end of the current DRX on-duration, during active time extension 604, outside active time extension 604 but within the DRX OFF period (e.g., via a scheduling request), at a beginning of the next on-duration, or a specified time (e.g., quantity of milliseconds (ms)) after the next on-duration starts. The UE 720 may transmit a BFD report with a BFI count and/or a current BFI history. The UE 720 may also transmit a channel measurement report.

The network entity 710 may perform an action based at least in part on the request. As shown by reference number 745, the network entity 710 may transmit a response to the request, indicating that the UE 720 may use active time extension 604, and may transmit BFD-RSs (e.g., aperiodic BFD-RSs). The network entity 710 may transmit the response via a MAC CE or DCI. The network entity 710 may transmit, and the UE 720 may receive, the response before the end of the current DRX on-duration. The response may include an indication of a periodicity within a requested burst of aperiodic BFD-RS. An action may include switching beams and indicating a beam switch. Other actions may include changing a BFD-RS configuration for the next DRX cycle, transmitting communications, and/or receiving communications.

In some aspects, the network entity 710 and/or the UE 720 may activate or deactivate use of a configured active time extension 604 via a MAC CE or UCI. The network entity 710 may transmit an indication to activate or deactivate active time extension 604 and include parameters such as a DRX on-duration length and a DRX OFF period length. The network entity 710 may transmit the indication based at least in part on a QoS requirement, a UE power or capability constraint, and/or overall network loading.

The network entity 710 may transmit additional information, such as an indication of a new periodicity of BFD-RSs or a location (e.g., time, frequency) of a requested aperiodic BFD-RS. The network entity 710 may transmit the indication after a current DRX active time, before the next DRX active time, or a specified time (e.g., ms) after a current DRX active time. The network entity 710 may indicate a validity of aperiodic BFD-RSs, which may be for a current DRX cycle, a specified quantity of DRX cycles, or a time (e.g., ms). If the UE 720 is configured with options for the above parameters, the network entity 710 may indicate a selection of those parameters via MAC CE or DCI.

As shown by reference number 750, the UE 720 may monitor the BFD-RSs during active time extension 604. The UE 720 may determine that the beam has failed based at least in part on measurements of the BFD-RSs during active time extension 604. As shown by reference number 755, the UE 720 may transmit a BFD report. In response, the network entity 710 may transmit a beam switch indication, as shown by reference number 760, which may be based at least in part on a preferred beam indicated in the BFD report. As shown by reference number 765, the UE 720 may switch to another beam before the next on-duration of the next DRX cycle. By using active time extension 604 to evaluate a beam, the UE 720 may determine a quality of a beam and take action before the next DRX cycle with information not available in only on-duration 602. In some aspects, the UE 720 may determine, using active time extension 604, that the current beam is of a sufficient quality and may maintain the beam. Use of an activation time extension for BFD may improve the QoS, reduce latency, and improve reliability.

In some aspects, the network entity 710 may initiate proactive beam switching. For example, the network entity 710 may indicate (e.g., via a MAC CE or DCI) a new beam independent of whether the UE 720 indicates a preferred beam. The UE 720 may switch to an indicated beam after receiving and decoding a response from the network entity 710. In some aspects, the network entity 710 may directly switch to a UE-preferred new beam. In this scenario, no signaling is used from the network entity 710 to the UE 720. The UE 720 may switch to the preferred new beam after a processing time of the network entity 710 and a propagation delay. Accurate delay timing at both the network entity 710 and the UE 720 may help with synchronization.

In some aspects, as shown by reference number 770, the network entity 710 may transmit additional information to use for the next DRX OFF period. If the network entity 710 determines that a BFD report in important and time sensitive, the network entity 710 may indicate additional resources for the UE 720 to use in the next DRX OFF period.

In some aspects, the network entity 710 may use a radio resource control (RRC) configuration to configure a triggering condition for the UE 720 to transmit an aperiodic BFD-RS request. The RRC configuration may indicate content of the request, including an expected aperiodic BFD-RS property pool, a periodicity of BFD-RSs, a location of BFD-RSs, and/or a validation time for BFD-RSs. The network entity 710 may transmit a MAC CE or DCI to switch configurations.

As indicated above, FIG. 7 is provided as an example. Other examples may differ from what is described with respect to FIG. 7.

Figure 8:
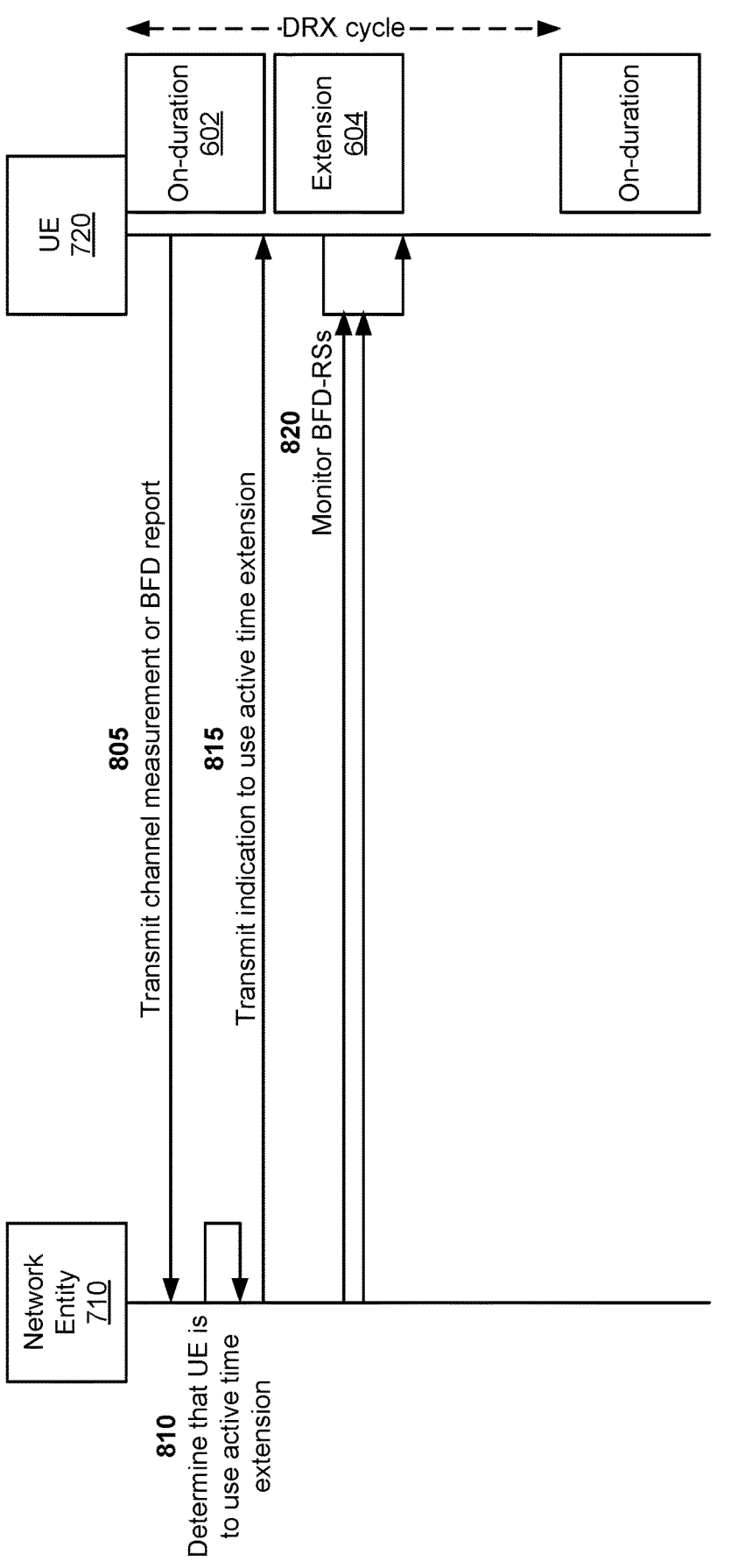
FIG. 8 is a diagram illustrating another example associated with an active time extension, in accordance with the present disclosure.

FIG. 8 is a diagram illustrating another example 800 associated with an active time extension, in accordance with the present disclosure.

In some aspects, the network entity 710 may trigger use of an active time extension 604 without receiving a request associated with active time extension 604 from the UE 720. As shown by reference number 805, the UE 720 may transmit a channel measurement or a BFD report. As shown by reference number 810, the network entity 710 may trigger use of an active time extension 604 based at least in part on the channel measurement, a current BFD report, a BFI count, and/or a BFD-RS measurement history. As shown by reference number 815, the network entity 710 may transmit an indication to use active time extension 604 (e.g., via a MAC CE or DCI). The indication may include a length for active time extension 604 from among configured lengths or include a new length or value. The network entity 710 may indicate validity information for active time extension 604. Validity information may include a specified length for which BFD-RSs or active time extension 604 is valid and/or for how many DRX cycles active time extension 604 is valid.

As shown by reference number 820, the UE 720 may proceed with monitoring BFD-RSs during active time extension 604 to produce a BFD report and switch beams, if necessary, before the next DRX on-duration.

In some aspects, the network entity 710 may transmit a PDCCH command to indicate new downlink or uplink transmission to trigger a UE inactivity timer, if the network entity 710 has data to communicate to the UE 720. Otherwise, the PDCCH command may indicate a new downlink communication that is empty. In this way, the network entity 710 may implicitly achieve the purpose of active time extension 604.

As indicated above, FIG. 8 is provided as an example. Other examples may differ from what is described with respect to FIG. 8.

Figure 9:
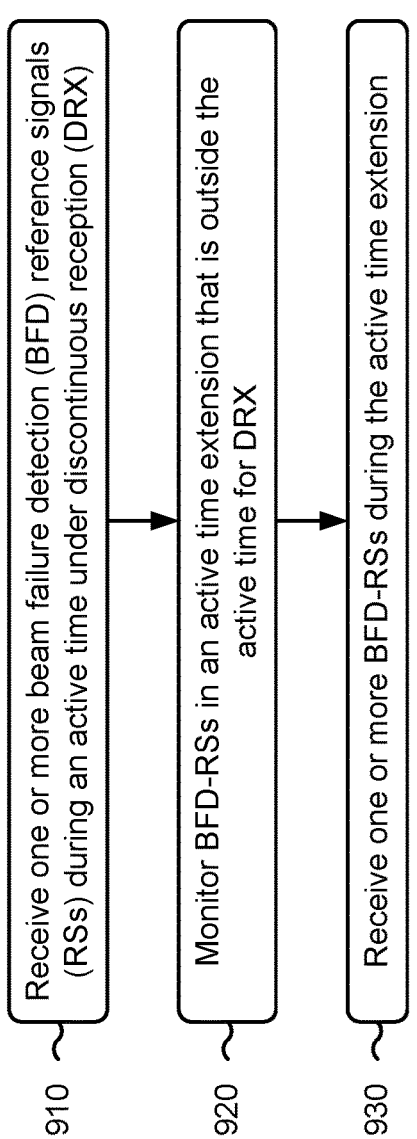
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120, UE 720) performs operations associated with an active time extension for beam failure detection during a DRX cycle.

As shown in FIG. 9, in some aspects, process 900 may include receiving one or more BFD-RSs during an active time under DRX (block 910). For example, the UE (e.g., using communication manager 1108 and/or reception component 1102 depicted in FIG. 11) may receive one or more BFD-RSs during an active time under DRX, as described above.

As further shown in FIG. 9, in some aspects, process 900 may include monitoring BFD-RSs in an active time extension that is outside the active time for DRX (block 920). For example, the UE (e.g., using communication manager 1108 and/or monitoring component 1110 depicted in FIG. 11) may monitor BFD-RSs in an active time extension that is outside the active time for DRX, as described above.

As further shown in FIG. 9, in some aspects, process 900 may include receiving one or more BFD-RSs during the active time extension (block 930). For example, the UE (e.g., using communication manager 1108 and/or reception component 1102 depicted in Fig.) may receive one or more BFD-RSs during the active time extension, as described above.

Process 900 may include additional aspects, such as any single aspect or any combination of aspects described below and/or in connection with one or more other processes described elsewhere herein.

In a first aspect, process 900 includes transmitting a request to receive the one or more BFD-RSs during the active time extension.

In a second aspect, alone or in combination with the first aspect, the request indicates one or more parameters for an aperiodic burst of BFD-RSs to be transmitted during the active time extension.

In a third aspect, alone or in combination with one or more of the first and second aspects, the one or more parameters are based at least in part on one or more of a quality-of-service requirement, a UE capability, or a power threshold.

In a fourth aspect, alone or in combination with one or more of the first through third aspects, process 900 includes receiving a response that indicates one or more of a periodicity of BFD-RSs within the aperiodic burst, a location of the aperiodic burst, or a validity of the aperiodic burst.

In a fifth aspect, alone or in combination with one or more of the first through fourth aspects, the monitoring includes monitoring the BFD-RSs in the active time extension in response to detecting a beam issue or a potential beam issue.

In a sixth aspect, alone or in combination with one or more of the first through fifth aspects, process 900 includes receiving a beam switch indication and switching to a beam based at least in part on the beam switch indication.

In a seventh aspect, alone or in combination with one or more of the first through sixth aspects, process 900 includes transmitting a channel measurement report or an indication of a potential beam quality issue.

In an eighth aspect, alone or in combination with one or more of the first through seventh aspects, process 900 includes transmitting a BFD report based at least in part on the one or more BFD-RSs received during the active time extension.

In a ninth aspect, alone or in combination with one or more of the first through eighth aspects, the BFD report includes a preferred beam that is based at least in part on the monitoring.

In a tenth aspect, alone or in combination with one or more of the first through ninth aspects, process 900 includes receiving a configuration for the active time extension or an activation indication to activate the active time extension for monitoring BFD-RSs, and monitoring includes monitoring BFD-RSs in the active time extension in response to receiving the configuration or receiving the indication.

In an eleventh aspect, alone or in combination with one or more of the first through tenth aspects, the configuration indicates one or more of a timing of a signal associated with a UE activity during the active time extension, a content of the signal, a resource that the UE may use to transmit the signal, a validity time of the configuration, a value for the active time extension, content of a BFD report, or a periodicity of a BFD report.

In a twelfth aspect, alone or in combination with one or more of the first through eleventh aspects, process 900 includes receiving an indication to switch to another configuration for the active time extension.

In a thirteenth aspect, alone or in combination with one or more of the first through twelfth aspects, process 900 includes receiving a deactivation indication to deactivate the active time extension for monitoring BFD-RSs and stopping the monitoring BFD-RSs in the active time extension.

In a fourteenth aspect, alone or in combination with one or more of the first through thirteenth aspects, process 900 includes starting an inactivity timer associated with the active time extension.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
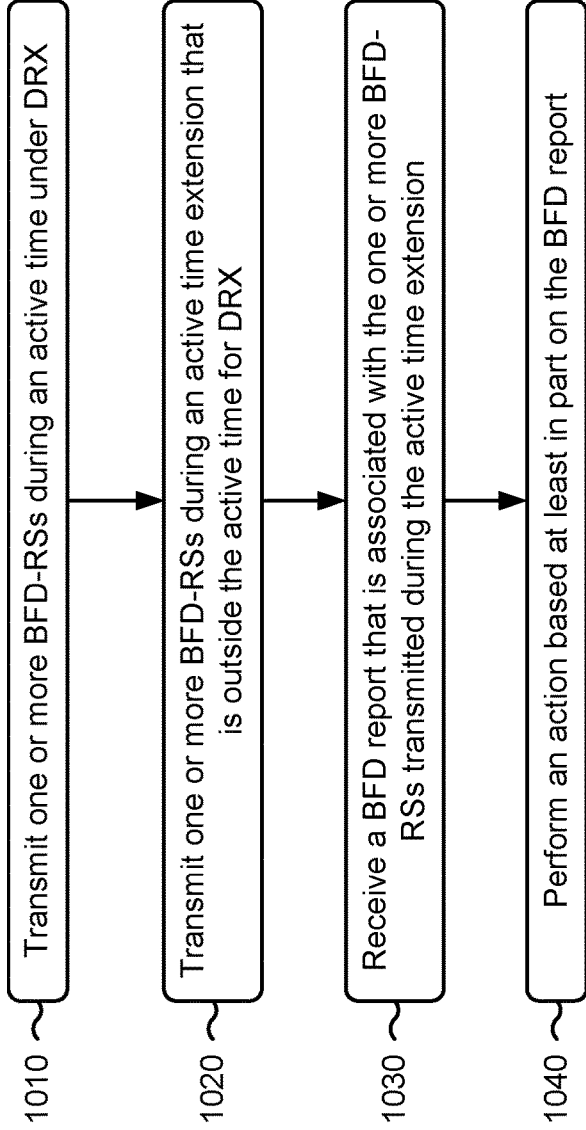
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., network entity 710) performs operations associated with an active time extension for beam failure detection during a DRX cycle.

As shown in FIG. 10, in some aspects, process 1000 may include transmitting one or more BFD-RSs during an active time under DRX (block 1010). For example, the network entity (e.g., using communication manager 1208 and/or transmission component 1204 depicted in FIG. 12) may transmit one or more BFD-RSs during an active time under DRX, as described above.

As further shown in FIG. 10, in some aspects, process 1000 may include transmitting one or more BFD-RSs during an active time extension that is outside the active time for DRX (block 1020). For example, the network entity (e.g., using communication manager 1208 and/or transmission component 1204 depicted in FIG. 12) may transmit one or more BFD-RSs during an active time extension that is outside the active time for DRX, as described above.

As further shown in FIG. 10, in some aspects, process 1000 may include receiving a BFD report that is associated with the one or more BFD-RSs transmitted during the active time extension (block 1030). For example, the network entity (e.g., using communication manager 1208 and/or reception component 1202 depicted in FIG. 12) may receive a BFD report that is associated with the one or more BFD-RSs transmitted during the active time extension, as described above.

As further shown in FIG. 10, in some aspects, process 1000 may include performing an action based at least in part on the BFD report (block 1040). For example, the network entity (e.g., using communication manager 1208 and/or action component 1210 depicted in FIG. 12) may perform an action based at least in part on the BFD report, as described above.

Process 1000 may include additional aspects, such as any single aspect or any combination of aspects described below and/or in connection with one or more other processes described elsewhere herein.

In a first aspect, transmitting the one or more BFD-RSs during the active time extension includes transmitting the one or more BFD-RSs during the active time extension in response to receiving a request to receive the one or more BFD-RSs during the active time extension.

In a second aspect, alone or in combination with the first aspect, transmitting the one or more BFD-RSs during the active time extension includes transmitting the one or more BFD-RSs based at least in part on one or more parameters, indicated by the request, that are associated with a quality-of-service requirement, a UE capability, or a power threshold for the UE.

In a third aspect, alone or in combination with one or more of the first and second aspects, process 1000 includes transmitting a configuration for the active time extension, an activation indication to activate the active time extension, a deactivation indication to deactivate the active time extension, or a beam switch indication.

In a fourth aspect, alone or in combination with one or more of the first through third aspects, the configuration, the activation indication, or the deactivation indication is based at least in part on one or more of a QoS requirement, a DRX configuration, a UE capability, a channel measurement, or a BFD report.

In a fifth aspect, alone or in combination with one or more of the first through fourth aspects, the BFD report includes a preferred beam.

In a sixth aspect, alone or in combination with one or more of the first through fifth aspects, the configuration indicates one or more of a timing of a signal associated with a UE activity during the active time extension, a content of the signal, a resource that the UE may use to transmit the signal, a validity time of the configuration, a value for the active time extension, content of a BFD report, or a periodicity of a BFD report.

In a seventh aspect, alone or in combination with one or more of the first through sixth aspects, the configuration includes a value for an inactivity timer that is associated with the active time extension.

In an eighth aspect, alone or in combination with one or more of the first through seventh aspects, process 1000 includes receiving a channel measurement report or an indication of a potential beam quality issue.

In a ninth aspect, alone or in combination with one or more of the first through eighth aspects, performing the action includes transmitting an indication to switch to another configuration for the active time extension.

In a tenth aspect, alone or in combination with one or more of the first through ninth aspects, process 1000 includes transmitting a deactivation indication to deactivate the active time extension for monitoring BFD-RSs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
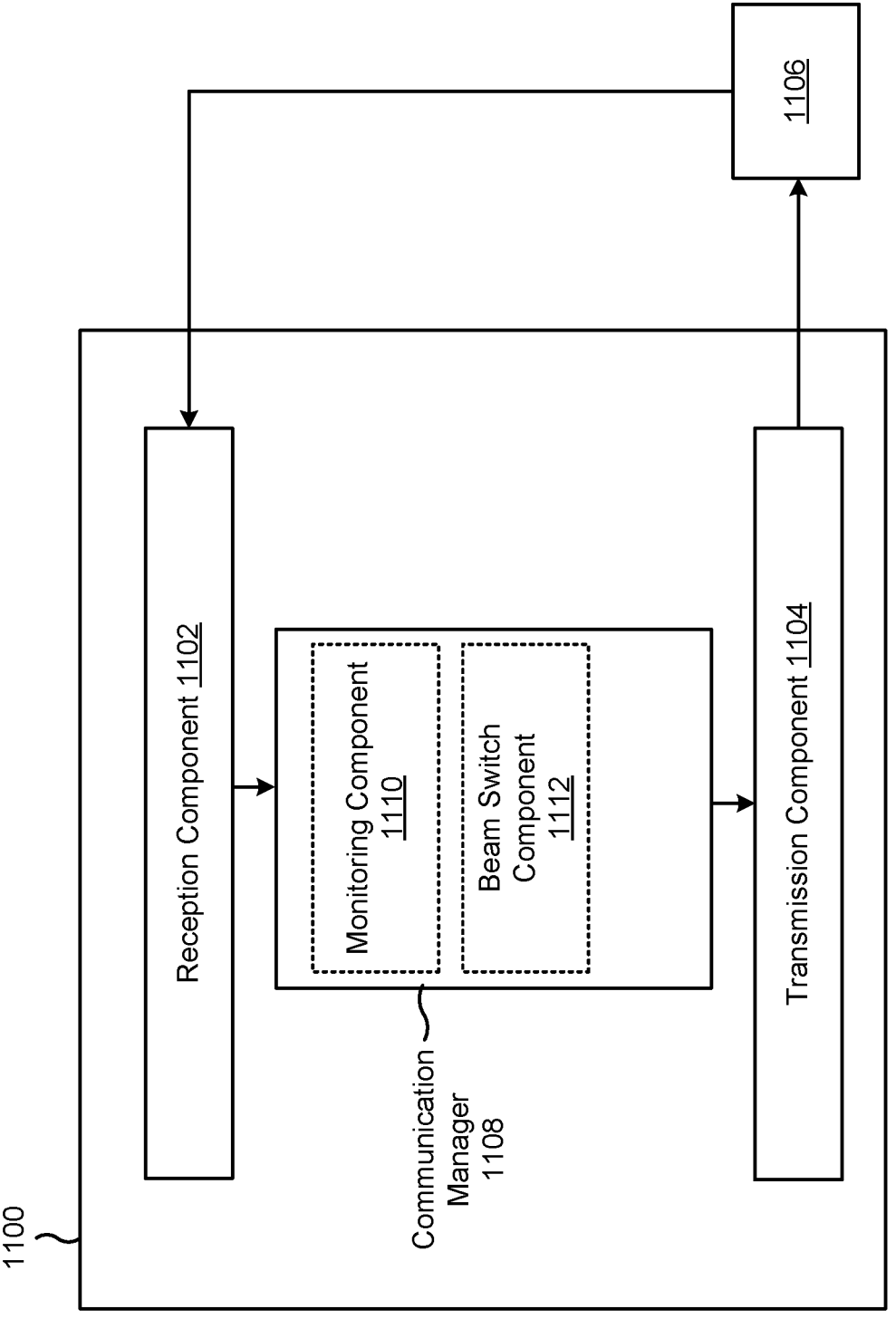
FIGS. 11-12 are diagrams of example apparatuses for wireless communication, in accordance with the present disclosure.

FIG. 11 is a diagram of an example apparatus 1100 for wireless communication. The apparatus 1100 may be a UE (e.g., a UE 120, UE 720), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a network entity, or another wireless communication device) using the reception component 1102 and the transmission component 1104. As further shown, the apparatus 1100 may include the communication manager 1108. The communication manager 1108 may control and/or otherwise manage one or more operations of the reception component 1102 and/or the transmission component 1104. In some aspects, the communication manager 1108 may include one or more antennas, a modem, a controller/processor, a memory, or a combination thereof, of the base station described in connection with FIG. 2. The communication manager 1108 may be, or be similar to, the communication manager 150 depicted in FIGS. 1 and 2. For example, in some aspects, the communication manager 1108 may be configured to perform one or more of the functions described as being performed by the communication manager 150. In some aspects, the communication manager 1108 may include the reception component 1102 and/or the transmission component 1104.

The communication manager 1108 may include a monitoring component 1110 and/or a beam switch component 1112, among other examples.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive one or more BFD-RSs during an active time under DRX. The monitoring component 1110 may monitor BFD-RSs in an active time extension that is outside the active time for DRX. The reception component 1102 may receive one or more BFD-RSs during the active time extension.

The transmission component 1104 may transmit a request to receive the one or more BFD-RSs during the active time extension. The reception component 1102 may receive a response that indicates one or more of a periodicity of BFD-RSs within the aperiodic burst, a location of the aperiodic burst, or a validity of the aperiodic burst.

The reception component 1102 may receive a beam switch indication. The beam switch component 1112 may switch to a beam based at least in part on the beam switch indication.

The transmission component 1104 may transmit a channel measurement report or an indication of a potential beam quality issue. The transmission component 1104 may transmit a BFD report based at least in part on the one or more BFD-RSs received during the active time extension.

The reception component 1102 may receive a configuration for the active time extension or an activation indication to activate the active time extension for monitoring BFD-RSs, and the monitoring component 1110 may monitor BFD-RSs in the active time extension in response to receiving the configuration or receiving the indication.

The reception component 1102 may receive an indication to switch to another configuration for the active time extension. The reception component 1102 may receive a deactivation indication to deactivate the active time extension for monitoring BFD-RSs. The monitoring component 1110 may stop the monitoring BFD-RSs in the active time extension. The monitoring component 1110 may start an inactivity timer associated with the active time extension.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
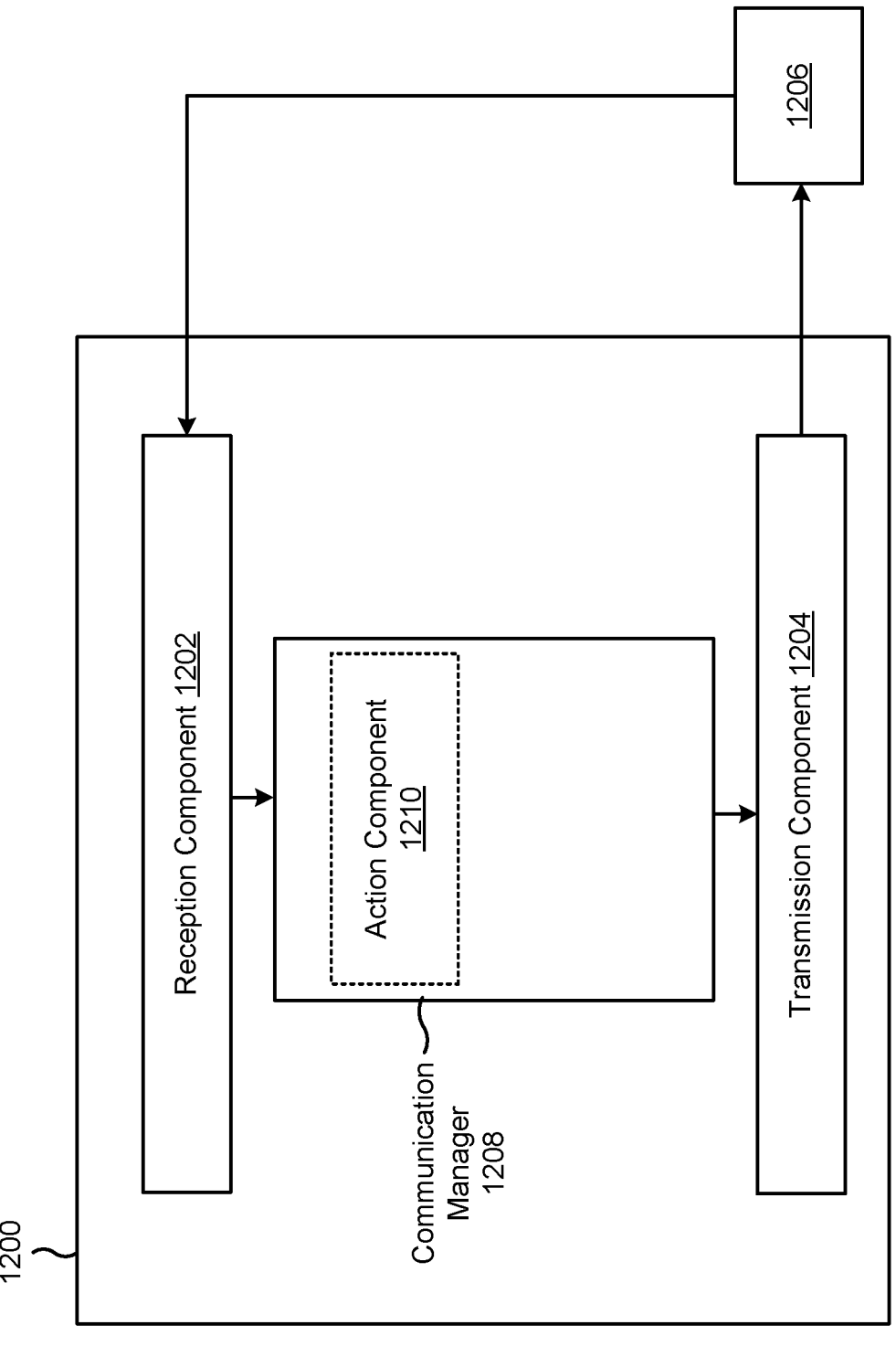

FIG. 12 is a diagram of an example apparatus 1200 for wireless communication. The apparatus 1200 may be a network entity (e.g., base station 110, network entity 710), or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a network entity, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the base station described in connection with FIG. 2. The communication manager 1208 may be, or be similar to, the communication manager 150 depicted in FIGS. 1 and 2. For example, in some aspects, the communication manager 1208 may be configured to perform one or more of the functions described as being performed by the communication manager 150. In some aspects, the communication manager 1208 may include the reception component 1202 and/or the transmission component 1204. The communication manager 1208 may include an action component 1210, among other examples.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The transmission component 1204 may transmit one or more BFD-RSs during an active time under DRX. The transmission component 1204 may transmit one or more BFD-RSs during an active time extension that is outside the active time for DRX. The reception component 1202 may receive a BFD report that is associated with the one or more BFD-RSs transmitted during the active time extension. The action component 1210 may perform an action based at least in part on the BFD report.

The transmission component 1204 may transmit a configuration for the active time extension, an activation indication to activate the active time extension, a deactivation indication to deactivate the active time extension, or a beam switch indication.

The reception component 1202 may receive a channel measurement report or an indication of a potential beam quality issue. The transmission component 1204 may transmit a deactivation indication to deactivate the active time extension for monitoring BFD-RSs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving one or more beam failure detection (BFD) reference signals (RSs) during an active time under discontinuous reception (DRX); monitoring BFD-RSs in an active time extension that is outside the active time for DRX; and receiving one or more BFD-RSs during the active time extension.

Aspect 2: The method of Aspect 1, further comprising transmitting a request to receive the one or more BFD-RSs during the active time extension.

Aspect 3: The method of Aspect 2, wherein the request indicates one or more parameters for an aperiodic burst of BFD-RSs to be transmitted during the active time extension.

Aspect 4: The method of Aspect 3 or 4, wherein the one or more parameters are based at least in part on one or more of a quality-of-service requirement, a UE capability, or a power threshold.

Aspect 5: The method of any of Aspects 3-4, further comprising receiving a response that indicates one or more of a periodicity of BFD-RSs within the aperiodic burst, a location of the aperiodic burst, or a validity of the aperiodic burst.

Aspect 6: The method of any of Aspects 1-5, wherein the monitoring includes monitoring the BFD-RSs in the active time extension in response to detecting a beam issue or a potential beam issue.

Aspect 7: The method of Aspect 6, further comprising: receiving a beam switch indication; and switching to a beam based at least in part on the beam switch indication.

Aspect 8: The method of any of Aspects 1-7, further comprising transmitting a channel measurement report or an indication of a potential beam quality issue.

Aspect 9: The method of any of Aspects 1-8, further comprising transmitting a BFD report based at least in part on the one or more BFD-RSs received during the active time extension.

Aspect 10: The method of Aspect 9, wherein the BFD report includes a preferred beam that is based at least in part on the monitoring.

Aspect 11: The method of any of Aspects 1-10, further comprising receiving a configuration for the active time extension or an activation indication to activate the active time extension for monitoring BFD-RSs, and wherein the monitoring includes monitoring BFD-RSs in the active time extension in response to receiving the configuration or receiving the indication.

Aspect 12: The method of Aspect 11, wherein the configuration indicates one or more of a timing of a signal associated with a UE activity during the active time extension, a content of the signal, a resource that the UE may use to transmit the signal, a validity time of the configuration, a value for the active time extension, content of a BFD report, or a periodicity of a BFD report.

Aspect 13: The method of Aspect 11 or 12, further comprising receiving an indication to switch to another configuration for the active time extension.

Aspect 14: The method of any of Aspects 1-13, further comprising: receiving a deactivation indication to deactivate the active time extension for monitoring BFD-RSs; and stopping the monitoring BFD-RSs in the active time extension.

Aspect 15: The method of any of Aspects 1-14, further comprising starting an inactivity timer associated with the active time extension.

Aspect 16: A method of wireless communication performed by a network entity, comprising: transmitting one or more beam failure detection (BFD) reference signals (RSs) during an active time under discontinuous reception (DRX); transmitting one or more BFD-RSs during an active time extension that is outside the active time for DRX; receiving a BFD report that is associated with the one or more BFD-RSs transmitted during the active time extension; and performing an action based at least in part on the BFD report.

Aspect 17: The method of Aspect 16, wherein transmitting the one or more BFD-RSs during the active time extension includes transmitting the one or more BFD-RSs during the active time extension in response to receiving a request to receive the one or more BFD-RSs during the active time extension.

Aspect 18: The method of Aspect 17, wherein transmitting the one or more BFD-RSs during the active time extension includes transmitting the one or more BFD-RSs based at least in part on one or more parameters, indicated by the request, that are associated with a quality-of-service requirement, a user equipment (UE) capability, or a power threshold for the UE.

Aspect 19: The method of any of Aspects 16-18, further comprising transmitting a configuration for the active time extension, an activation indication to activate the active time extension, a deactivation indication to deactivate the active time extension, or a beam switch indication.

Aspect 20: The method of Aspect 19, wherein the configuration, the activation indication, or the deactivation indication is based at least in part on one or more of a quality-of-service requirement, a DRX configuration, a user equipment capability, a channel measurement, or a BFD report.

Aspect 21: The method of Aspect 20, wherein the BFD report includes a preferred beam.

Aspect 22: The method of Aspect 19, wherein the configuration indicates one or more of a timing of a signal associated with a UE activity during the active time extension, a content of the signal, a resource that the UE may use to transmit the signal, a validity time of the configuration, a value for the active time extension, content of a BFD report, or a periodicity of a BFD report.

Aspect 23: The method of Aspect 19 or 20, wherein the configuration includes a value for an inactivity timer that is associated with the active time extension.

Aspect 24: The method of any of Aspects 16-23, further comprising receiving a channel measurement report or an indication of a potential beam quality issue.

Aspect 25: The method of any of Aspects 16-24, wherein performing the action includes transmitting an indication to switch to another configuration for the active time extension.

Aspect 26: The method of any of Aspects 16-25, further comprising transmitting a deactivation indication to deactivate the active time extension for monitoring BFD-RSs.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, configured to:
        receive one or more beam failure detection (BFD) reference signals (RSs) during a discontinuous reception (DRX) active time;
        transmit, to a network entity, a request that signals use of an active time extension which extends into a DRX off period, the request including a time value for the active time extension;
        monitor BFD-RSs, in the active time extension, based at least in part on the request and extending the DRX active time into the DRX off period; and
        receive one or more BFD-RSs during the active time extension.

2. The UE of claim 1,
wherein the request requests reception of the one or more BFD-RSs during the active time extension.

3. The UE of claim 2,
wherein the request indicates one or more parameters for an aperiodic burst of BFD-RSs to be transmitted during the active time extension.

4. The UE of claim 3,
wherein the one or more parameters are based at least in part on one or more of a quality-of-service requirement, a UE capability, or a power threshold.

5. The UE of claim 3,
wherein the one or more processors are configured to receive a response that indicates one or more of a periodicity of BFD-RSs within the aperiodic burst, a location of the aperiodic burst, or a validity of the aperiodic burst.

6. The UE of claim 1,
wherein the monitoring includes monitoring the BFD-RSs in the active time extension in response to detecting a beam issue or a potential beam issue.

7. The UE of claim 6,
wherein the one or more processors are configured to:
    receive a beam switch indication; and
    switch to a beam based at least in part on the beam switch indication.

8. The UE of claim 1,
wherein the one or more processors are configured to transmit a channel measurement report or an indication of a potential beam quality issue.

9. The UE of claim 1,
wherein the one or more processors are configured to transmit a BFD report based at least in part on the one or more BFD-RSs received during the active time extension.

10. The UE of claim 9,
wherein the BFD report includes a preferred beam that is based at least in part on the monitoring.

11. The UE of claim 1,
wherein the one or more processors are configured to receive a configuration for the active time extension or an activation indication to activate the active time extension for monitoring BFD-RSs, and wherein the one or more processors, to monitor BFD-RSs, are configured to monitor BFD-RSs in the active time extension in response to receiving the configuration or receiving the activation indication.

12. The UE of claim 11,
wherein the configuration indicates one or more of a timing of a signal associated with a UE activity during the active time extension, a content of the signal, a resource that the UE may use to transmit the signal, a validity time of the configuration, a value for the active time extension, content of a BFD report, or a periodicity of a BFD report.

13. The UE of claim 11,
wherein the one or more processors are configured to receive an indication to switch to another configuration for the active time extension.

14. The UE of claim 1,
wherein the one or more processors are configured to:
    receive a deactivation indication to deactivate the active time extension for monitoring BFD-RSs; and
    stop the monitoring BFD-RSs in the active time extension.

15. The UE of claim 1,
wherein the one or more processors are configured to start an inactivity timer associated with the active time extension.

16. The UE of claim 1,
wherein the request includes an active time extension flag that includes at least one of a length, a starting time, or an ending time for the active time extension.

17. The UE of claim 1,
wherein the request includes an active time extension flag that includes at least one of a starting time or an ending time for the active time extension.

18. A network entity for wireless communication, comprising:

one or more memories; and one or more processors, coupled to the one or more memories, configured to:

transmit one or more beam failure detection (BFD) reference signals (RSs) during a discontinuous reception (DRX) active time;

receive, from a UE, a request that signals use of an active time extension which extends into a DRX off period, the request including a time value for the active time extension;

transmit one or more BFD-RSs, during the active time extension, based at least in part on the request and extending the DRX active time into the DRX off period;

receive, from the UE, a BFD report that is associated with the one or more BFD-RSs transmitted during the active time extension; and perform an action based at least in part on the BFD report.

19. The network entity of claim 18, wherein the one or more processors, to transmit the one or more BFD-RSs during the active time extension, are configured to transmit the one or more BFD-RSs during the active time extension in response to receiving the request.

20. The network entity of claim 19, wherein the one or more processors, to transmit the one or more BFD-RSs during the active time extension, are configured to transmit the one or more BFD-RSs based at least in part on one or more parameters, indicated by the request, that are associated with a quality-of-service requirement, a user equipment (UE) capability, or a power threshold for the UE.

21. The network entity of claim 18, wherein the one or more processors are configured to transmit a configuration for the active time extension, an activation indication to activate the active time extension, a deactivation indication to deactivate the active time extension, or a beam switch indication.

22. The network entity of claim 21, wherein the configuration, the activation indication, or the deactivation indication is based at least in part on one or more of a quality-of-service requirement, a DRX configuration, a user equipment capability, a channel measurement, or a current BFD report.

23. The network entity of claim 22, wherein the BFD report includes a preferred beam.

24. The network entity of claim 21, wherein the configuration indicates one or more of a timing of a signal associated with a user equipment (UE) activity during the active time extension, a content of the signal, a resource that a UE may use to transmit the signal, a validity time of the configuration, a value for the active time extension, content of a BFD report, or a periodicity of a BFD report.

25. The network entity of claim 21, wherein the configuration includes a value for an inactivity timer that is associated with the active time extension.

26. The network entity of claim 18, wherein the one or more processors are configured to receive a channel measurement report or an indication of a potential beam quality issue.

27. The network entity of claim 18, wherein the one or more processors, to perform the action, are configured to transmit an indication to switch to another configuration for the active time extension.

28. The network entity of claim 18, wherein the one or more processors are configured to transmit a deactivation indication to deactivate the active time extension for monitoring BFD-RSs.

29. A method of wireless communication performed by a user equipment (UE), comprising:

receiving one or more beam failure detection (BFD) reference signals (RSs) during a current discontinuous reception (DRX) active time;

transmitting, to a network entity, a request that signals use of an active time extension which extends into a DRX off period, the request including a time value for the active time extension;

monitoring BFD-RSs, in the active time extension, based at least in part on the request and extending the DRX active time into the DRX off period; and receiving one or more BFD-RSs during the active time extension.

30. A method of wireless communication performed by a network entity, comprising:

transmitting one or more beam failure detection (BFD) reference signals (RSs) during a discontinuous reception (DRX) active time;

receiving, from a user equipment (UE), a request that signals use of an active time extension which extends into a DRX off period, the request including a time value for the active time extension;

transmitting one or more BFD-RSs, during the active time extension, based at least in part on the request and extending the DRX active time into the DRX off period;

receiving, from the UE, a BFD report that is associated with the one or more BFD-RSs transmitted during the active time extension; and performing an action based at least in part on the BFD report.

* * * * *